(12) United States Patent
Dekel

(10) Patent No.: US 9,087,372 B2
(45) Date of Patent: *Jul. 21, 2015

(54) AUTOMATED FLY THROUGH REVIEW MECHANISM

(71) Applicant: General Electric Company, Schenectady, NY (US)

(72) Inventor: Shai Dekel, Ramat-Hasharon (IL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,957

(22) Filed: Dec. 27, 2013

(65) Prior Publication Data

US 2014/0126792 A1 May 8, 2014

Related U.S. Application Data

(63) Continuation of application No. 13/467,718, filed on May 9, 2012, now Pat. No. 8,644,569, which is a continuation of application No. 12/466,571, filed on May 15, 2009, now Pat. No. 8,199,989.

(51) Int. Cl.
| | |
|---|---|
| *G06K 9/00* | (2006.01) |
| *G06T 7/00* | (2006.01) |
| *G06T 5/00* | (2006.01) |
| *G06T 5/50* | (2006.01) |

(52) U.S. Cl.
CPC .............. *G06T 7/0012* (2013.01); *G06T 5/003* (2013.01); *G06T 5/50* (2013.01); *G06T 7/0036* (2013.01); *G06T 2207/10016* (2013.01); *G06T 2207/10056* (2013.01); *G06T 2207/20016* (2013.01); *G06T 2207/20064* (2013.01); *G06T 2207/20221* (2013.01); *G06T 2207/30024* (2013.01)

(58) Field of Classification Search
USPC .................................................. 382/128, 131
See application file for complete search history.

(56) References Cited

U.S. PATENT DOCUMENTS

| 8,199,989 B2 | 6/2012 | Dekel |
| 2009/0016589 A1 | 1/2009 | Wolf et al. |
| 2010/0290678 A1 | 11/2010 | Dekel |

OTHER PUBLICATIONS

United States Patent and Trademark Office, "Non-Final Rejection," issued in connection with U.S. Appl. No. 12/466,571, mailed on Oct. 31, 2011 (11 pages).
United States Patent and Trademark Office, "Notice of Allowance," issued in connection with U.S. Appl. No. 12/466,571, mailed on Feb. 10, 2012 (5 pages).
United States Patent and Trademark Office, "Non-Final Rejection," issued in connection with U.S. Appl. No. 13/467,718, mailed on Jun. 14, 2013 (12 pages).
United States Patent and Trademark Office, "Notice of Allowance," issued in connection with U.S. Appl. No. 13/467,718, mailed on Oct. 3, 2013 (7 pages).

*Primary Examiner* — Joseph Chang
(74) *Attorney, Agent, or Firm* — Hanley, Flight and Zimmerman, LLC

(57) ABSTRACT

A novel and useful mechanism for generating a fly-through review for digital images such as tissue sample scans. A fly-through path based on the sample image is determined and one or more fly-through curves are generated. Two-dimensional image manipulations are applied to the sample image in accordance with the one or more fly-through curves and any user preferences to generate a sequence of frame images to be displayed.

17 Claims, 13 Drawing Sheets

US 9,087,372 B2

AUTOMATED FLY THROUGH REVIEW MECHANISM

CROSS-REFERENCE TO RELATED APPLICATIONS

The present application claims the benefit as a continuation of and priority to U.S. patent application Ser. No. 13/467,718, filed on May 9, 2012, for "Automated Fly Through Review Mechanism," which is a continuation of U.S. patent application Ser. No. 12/466,571, filed on May 15, 2009, for "Automated Fly Through Review Mechanism," each of which are incorporated herein by reference in their entireties

FIELD OF THE INVENTION

The subject matter disclosed herein relates to the field of digital imaging, and more particularly relates to a mechanism for automatically generating a fly through review such as for digitized pathology tissue scans.

BACKGROUND OF THE INVENTION

Pathology is the study and diagnosis of diseases by examining body tissues, typically under magnification. Currently, pathologists manually review stained tissue samples on glass slides under an optical microscope to render a diagnosis. Tissue samples are typically prepared with stains by a specialist called a histotechnician. Today, pathologists use an optical microscope to look at slides of tissue samples. This process has not changed much in over 100 years. Due to this manual process, the initial diagnosis and subsequent second opinions may be delayed as the correct slides must be physically delivered to the proper pathologist.

Digitizing the tissue sample images enables easier and faster evaluation without the organization, shipment and management of glass slides. Using digital pathology techniques will speed turnaround time and improve pathologists' overall diagnostic processes. In light of mounting healthcare cost pressures and the pervasive need to digitize a patient's medical record place such techniques and solutions in high demand. This area of digital pathology is known as Whole Slide Imaging (WSI) in which entire slides are digitally scanned so that they can be viewed on a computer.

In some scenarios, a pathologist reviewing tissue on a glass slide wishes to analyze the boundary area of the tissue sample or the border area between two types of tissue. When using an optical microscope, the pathologist is accustomed to quickly navigating and reviewing the tissue borders at high magnification by fast manual adjustment of the physical glass slide. FIG. 1 illustrates a typical 'zigzag' review path 12 of a pathologist near the boundary of the tissue sample 10 mounted on a glass slide 14. FIG. 2 illustrates a typical rendering at high resolution of the border 22 of the tissue sample 20. Note that the area 24 to the left of the border is air whereby the pathologist views only the glass slide. Note also that the edge of the tissue 22 is vertically aligned near the center of the image.

Pathologists, however, are finding it difficult to 'mimic' their ultra-fast optical workflow using the new digital workflow because manipulation of the rendered digital image displayed on the monitor is more cumbersome than the physical handling of the glass slide under an optical microscope. For example, prior art image viewers require users to switch between 'pan' and 'rotate' modes by either (1) clicking on different buttons or (2) by using right mouse click options. Only after the appropriate mode has been selected, can the user manipulate the rendered image in one of these modes. Thus, tracking the boundary of an object while rotating the view such that this boundary is vertical at all times is a daunting task for a pathologist that needs to review dozens of slides per day.

One prior art solution to this problem is to provide the pathologist with an 'input device' that simulates the controls of an optical microscope and mimics the physical experience of manual interaction with a glass slide. Such an input device may have knobs and controls that are similar to the ones found on an optical microscope. Such a solution, however, does not take advantage of the digital representation of the image.

BRIEF DESCRIPTION OF THE INVENTION

There is thus provided in accordance with an embodiment of the invention, a method of generating a fly-through review for a digitally imaged tissue sample, the method comprising the steps of determining a fly-through path based on the sample image to generate one or more fly-through curves and applying two-dimensional image manipulations to the sample image in accordance with the one or more fly-through curves to generate a sequence of frame images to be displayed.

There is also provided in accordance with an embodiment of the invention, a client computer for performing a fly-through review of a digitally imaged tissue sample comprising a communications interface for receiving image data from an external image storage device adapted to store the sample image, a fly-through path generator operative to determine a fly-through path based on the sample image data to generate one or more fly-through curves and an image manipulation module operative to apply two-dimensional image manipulations to the sample image in accordance with the one or more fly-through curves generated by the fly-through path generator to generate a sequence of frame images to be displayed.

There is further provided in accordance with an embodiment of the invention, a computer program product characterized by that upon loading it into computer memory a fly-through review process is executed, the computer program product comprising a computer usable medium having computer usable program code embodied therewith, the computer usable program code comprising computer usable code configured to determine a fly-through path based on the sample image to generate one or more fly-through curves and computer usable code configured to apply two-dimensional image manipulations to the sample image in accordance with the one or more fly-through curves to generate a sequence of frame images to be displayed.

There is also provided in accordance with an embodiment of the invention, a method of generating a fly-through review for a tissue sample digitally imaged at a plurality of focal plane levels, the method comprising the steps of dividing each sample image into a plurality of regions of interest (ROIs), determining a fly-through path based on the sample images to generate one or more fly-through curves, selecting an optimum focal plane level from the plurality of focal plane levels, rendering an ROI at the selected focal plane level and applying two-dimensional image manipulations to the rendered ROI image data in accordance with the one or more fly-through curves to generate a sequence of frame images to be displayed.

There is further provided in accordance with an embodiment of the invention, a computer program product characterized by that upon loading it into computer memory a fly-through review process for a tissue sample digitally imaged at a plurality of focal plane levels is executed, the computer program product comprising a computer usable medium having computer usable program code embodied therewith, the computer usable program code comprising computer usable code configured to divide each sample image into a plurality of regions of interest (ROIs), computer usable code configured to determine a fly-through path based on the sample images to generate one or more fly-through curves, computer usable code configured to select an optimum focal plane level from the plurality of focal plane levels, computer usable code configured to render an ROI at the selected focal plane level and computer usable code configured to apply two-dimensional image manipulations to the rendered ROI image data in accordance with the one or more fly-through curves to generate a sequence of frame images to be displayed.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document:

| Term | Definition |
| --- | --- |
| ASIC | Application Specific Integrated Circuit |
| CDROM | Compact Disc Read Only Memory |
| CPU | Central Processing Unit |
| DCT | Discrete Cosine Transform |
| DSP | Digital Signal Processor |
| DVD | Digital Versatile Disc |
| EPROM | Erasable Programmable Read-Only Memory |
| FIR | Finite Impulse Response |
| FPGA | Field Programmable Gate Array |
| FTP | File Transfer Protocol |
| FWT | Forward Wavelet Transform |
| GUI | Graphical User Interface |
| HTTP | Hyper-Text Transport Protocol |
| I/F | Interface |
| I/O | Input/Output |
| IP | Internet Protocol |
| IWT | Inverse Subband/Wavelet Transform |
| JPEG | Joint Photographic Experts Group |
| LAN | Local Area Network |
| MAC | Media Access Control |
| NIC | Network Interface Card |
| RAM | Random Access Memory |
| RF | Radio Frequency |
| RGB | Red, Green, Blue |
| ROI | Region of Interest |
| ROM | Read Only Memory |
| SAN | Storage Area Network |
| SMTP | Simple Mail Transfer Protocol |
| TCP | Transmission Control Protocol |
| URL | Uniform Resource Locator |
| WAN | Wide Area Network |
| WSI | Whole Slide Imaging |
| WWAN | Wireless Wide Area Network |

Detailed Description of the Invention

The present invention is a method of generating a fly-through review for a digitally imaged tissue sample whereby a fly-through path is determined based on a sample image to generate one or more fly-through curves. Two-dimensional image manipulations are applied to the sample image in accordance with the one or more fly-through curves and any user preferences to generate a sequence of frame images to be displayed.

Client Server System

Figure 3:
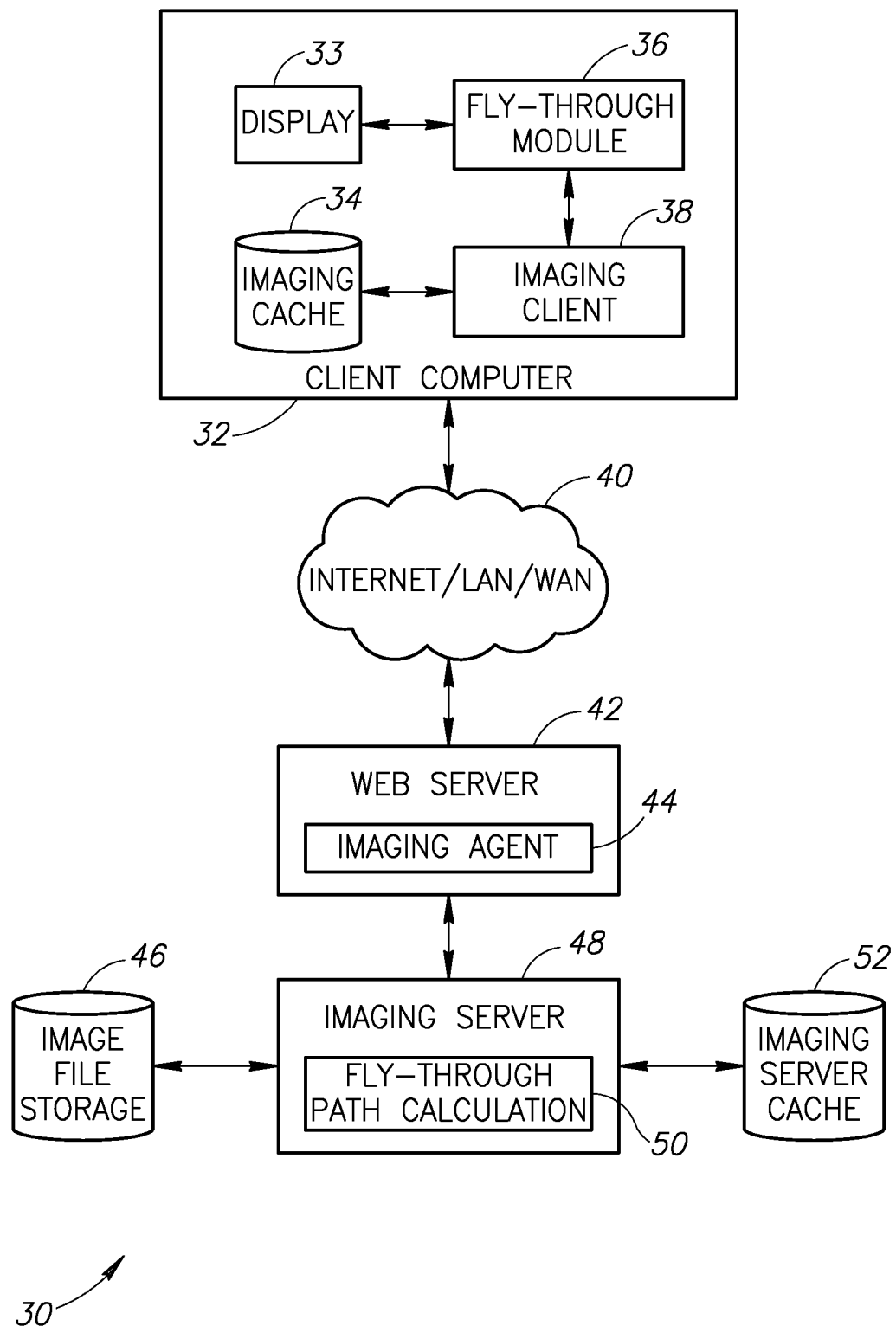
FIG. 3 is a block diagram illustrating a client server system constructed in accordance with the present invention.

A block diagram illustrating a client server system constructed in accordance with the present invention is shown in FIG. 3. The system, generally referenced 30, comprises one or more client computers 32 coupled to a communication network 40, such as the Internet, Intranet, wide area network (WAN), wireless wide area network (WWAN), local area network (LAN), storage area network (SAN), etc. Those having ordinary skill in the art will recognize that any of a variety of communication networks may be used to implement the present invention.

The server portion of the system 30 comprises a web server 42 with integrated imaging agent 44, an imaging server 48, an image file storage 46 and an imaging server cache 52. The web server 42, imaging server 48, image file storage 46 and imaging server cache 52 communicate with each other using any suitable language/protocol such as SMTP, HTTP, TCP/IP, etc.

In one embodiment, the client computer 32 and server computers 42, 48 may comprise an MAC or PC-type computer operating with an Intel or AMD microprocessor or equivalent. Each of the computers 32, 42, 48 may include a cache (e.g., 52) and suitable storage device (e.g., 46), such as a high-capacity disk, CDROM, DVD, or the like.

The client computer 32 comprises an imaging client 38, imaging cache 34, fly-through module 36 and display 33. The imaging client communicates with the imaging agent in the web server over the network and is operative to retrieve imaging data streamed from the imaging server 48. The fly-through module 36 communicates with the imaging client to receive any necessary imaging data for generating the fly-through review.

Note that in one embodiment, the entire fly-through module is implemented on the client computer. In an alternative embodiment, the fly-through path calculation is implemented on a back-end computer such as the imaging server 48 in a fly-through path calculation task or module 50. In this embodiment, the path calculation results are communicated back to the fly-through module 36 for display to the user.

Note also that the fly-through module and/or the imaging client may be implemented as plug-ins on a standard web browser. In this embodiment, the web browser comprises imaging client software and fly-through review software that loads into the browser. The web browser may comprise any suitable browser such as Mozilla Firefox, Apple Safari, Microsoft Internet Explorer, Google Chrome, etc.

In an alternative embodiment, the imaging server is not present. Rather, the client pulls image data directly from an image storage device (hard drive, etc.) and the all fly-through calculations and processing is performed on the client computer.

Computer Processing System

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
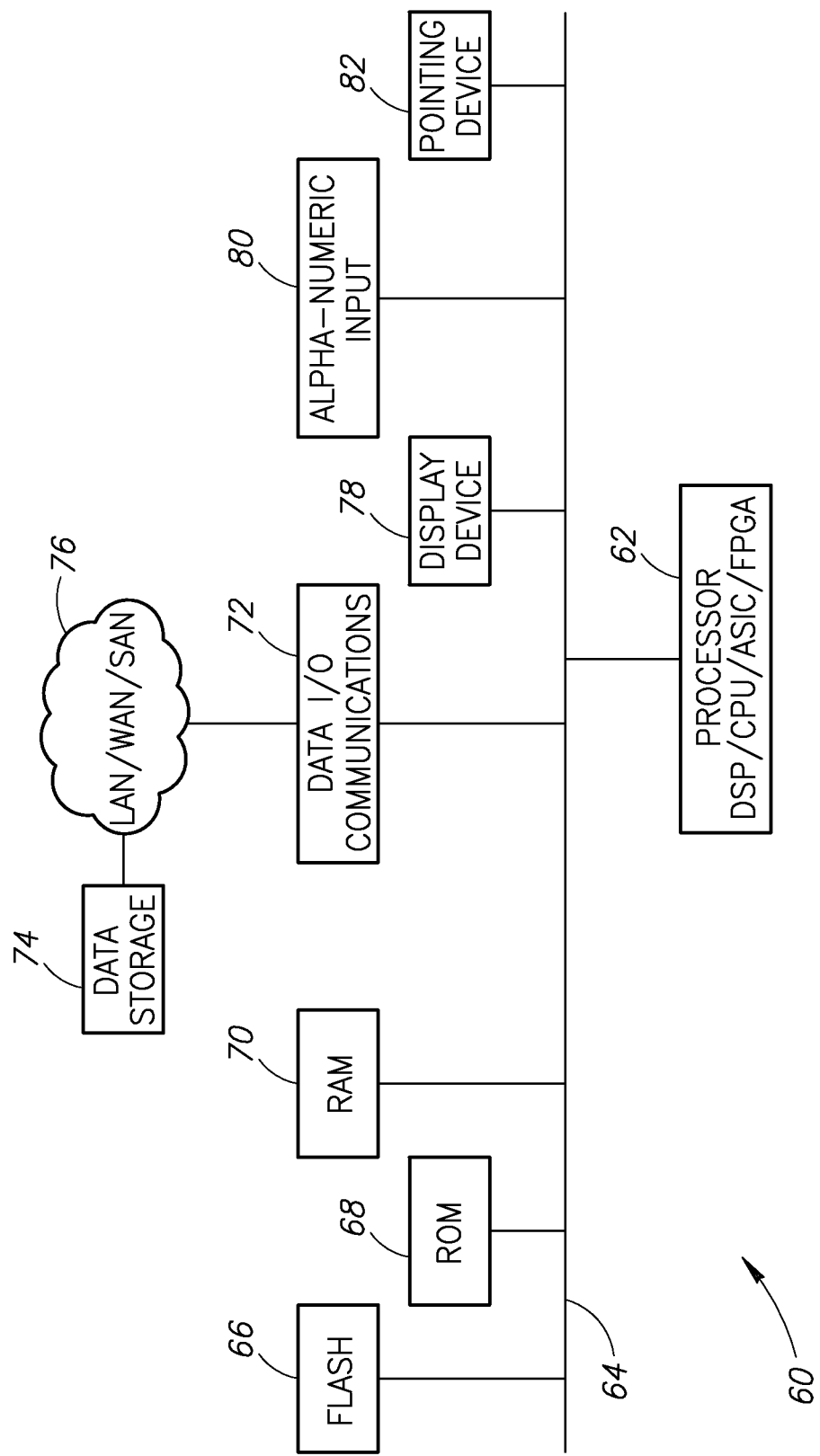
FIG. 4 is a block diagram illustrating an example computer processing system for implementing the mechanism of the present invention.

A block diagram illustrating an example computer processing system for implementing the fly-through review mechanism of the present invention is shown in FIG. 4. The computer system, generally referenced 60, comprises a processor 62 which may comprise a digital signal processor (DSP), central processing unit (CPU), microcontroller, microprocessor, microcomputer, ASIC or FPGA core. The system also comprises static read only memory 68 and dynamic main memory 70 all in communication with the processor. The processor is also in communication, via bus 64, with a number of peripheral devices that are also included in the computer system. Peripheral devices coupled to the bus include a display device 78 (e.g., monitor), alpha-numeric input device 80 (e.g., keyboard) and pointing device 82 (e.g., mouse, tablet, etc.)

The computer system is connected to one or more external networks such as a LAN/WAN/SAN 76 via communication lines connected to the system via data I/O communications interface 72 (e.g., network interface card or NIC). The network adapters 72 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 74 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the fly-through review mechanism of the present invention is adapted to reside on a computer readable medium, such as a magnetic disk within a disk drive unit. Alternatively, the computer readable medium may comprise a floppy disk, removable hard disk, flash memory 66, EEROM based memory, bubble memory storage, ROM storage, distribution media, intermediate storage media, execution memory of a computer, and any other medium or device capable of storing for later reading by a computer a computer program implementing the mechanism of this invention. The software adapted to implement the fly-through review mechanism of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the fly-through review mechanism of the present invention, and to the extent that a particular system configuration is capable of implementing the system and methods of this invention, it is equivalent to the representative digital computer system of FIG. 4 and within the spirit and scope of this invention.

Once they are programmed to perform particular functions pursuant to instructions from program software that implements the system and methods of this invention, such digital computer systems in effect become special purpose computers particular to the mechanism of this invention. The techniques necessary for this are well-known to those skilled in the art of computer systems.

It is noted that computer programs implementing the system and methods of this invention will commonly be distributed to users on a distribution medium such as floppy disk or CDROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Fly-Through Review

The fly-through review mechanism improves the whole slide imaging (WSI) review process for pathologists by taking advantage of the digital representation of the tissue sample images. The mechanism provides pathologists with assisting tools that can be used by the radiology community to perform fly-through reviews of high resolution digitally scanned tissue samples. In operation, the fly-through mechanism identifies the tissue boundary (with air) or the border between two tissue types and generates an automatic or a semi-automatic rendering of the review path.

Figure 5:
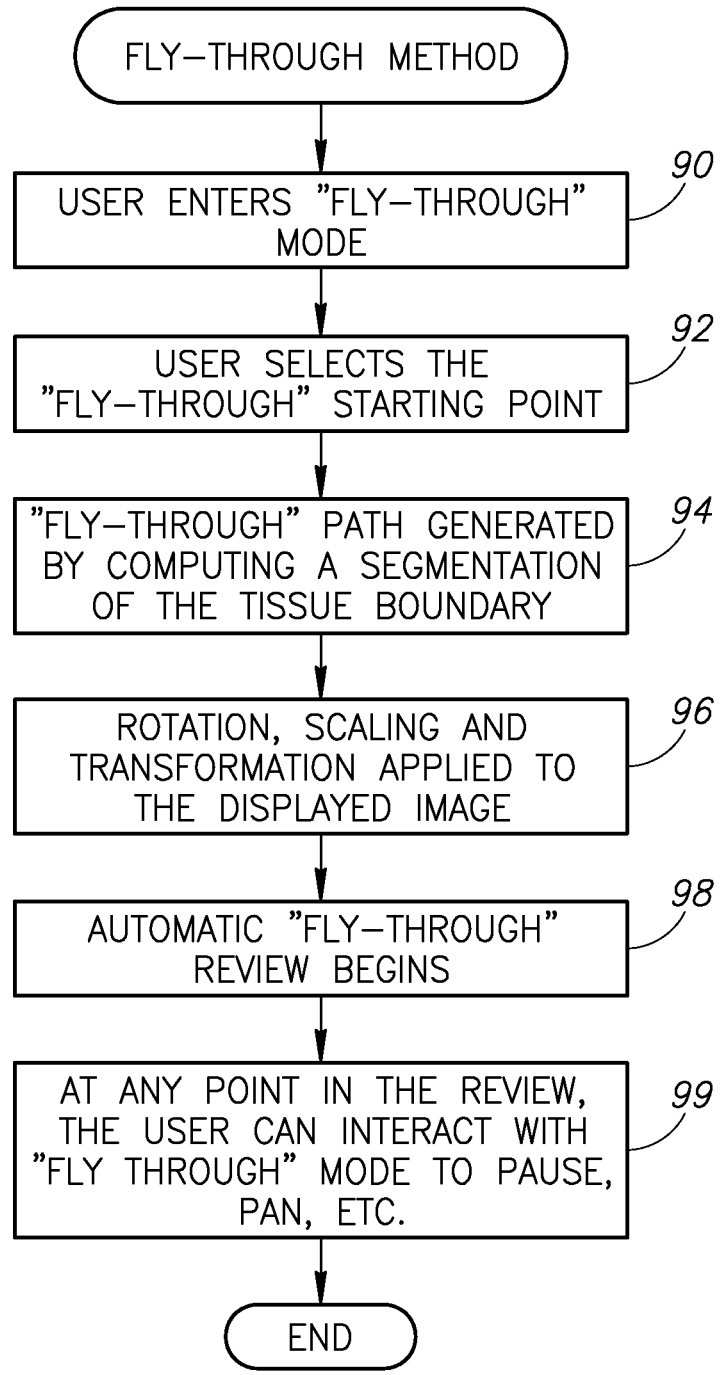
FIG. 5 is a flow diagram illustrating an example embodiment of the fly-through mechanism of the present invention.

A flow diagram illustrating an example embodiment of the fly-through mechanism of the present invention is shown in FIG. 5. In one embodiment, once the pathologists selects to perform a fly-through review of a sample (step 90), the following is performed. The user then selects a tissue boundary point or a point on the border between two types of tissue that serves as the fly-through start point (step 92). Note that the start point may be generated by the mechanism such as selecting a point along the fly-through path calculated (i.e. on a random or other basis).

The fly-through path is then generated (step 94). The fly-through path is generated by computing a segmentation of the tissue boundary (i.e. either tissue/air or tissues/tissue). The images to be displayed, generated based on the fly-through path, are automatically rotated and aligned such that the edge appears vertically and the tissue occupies a predetermined portion of the screen (step 96). For example, in FIG. 2, the tissue occupies about 60% of the screen.

An automatic fly-through review then begins (step 98). The mechanism displays a continuous travel along the edge using predetermined parameters such as speed, magnification level, etc. In an alternative embodiment, the rendered image is automatically panned and rotated such that the tissue boundary is aligned in a particular way (such as preferred by the user) and the tissue portion of the image occupies a specific percentage of the screen.

A mechanism is provided that permits a pathologist or other use to interact with the fly-through review at any point in time in a number of various ways (step 99). For example, the mechanism permits a user to (1) pause/continue the fly-through; (2) increase or decrease the flight speed; (3) pan around the current center point of the fly-through; and (4) pan left and right along an imaginary line perpendicular to the trajectory of the fly-through path.

Figure 6:
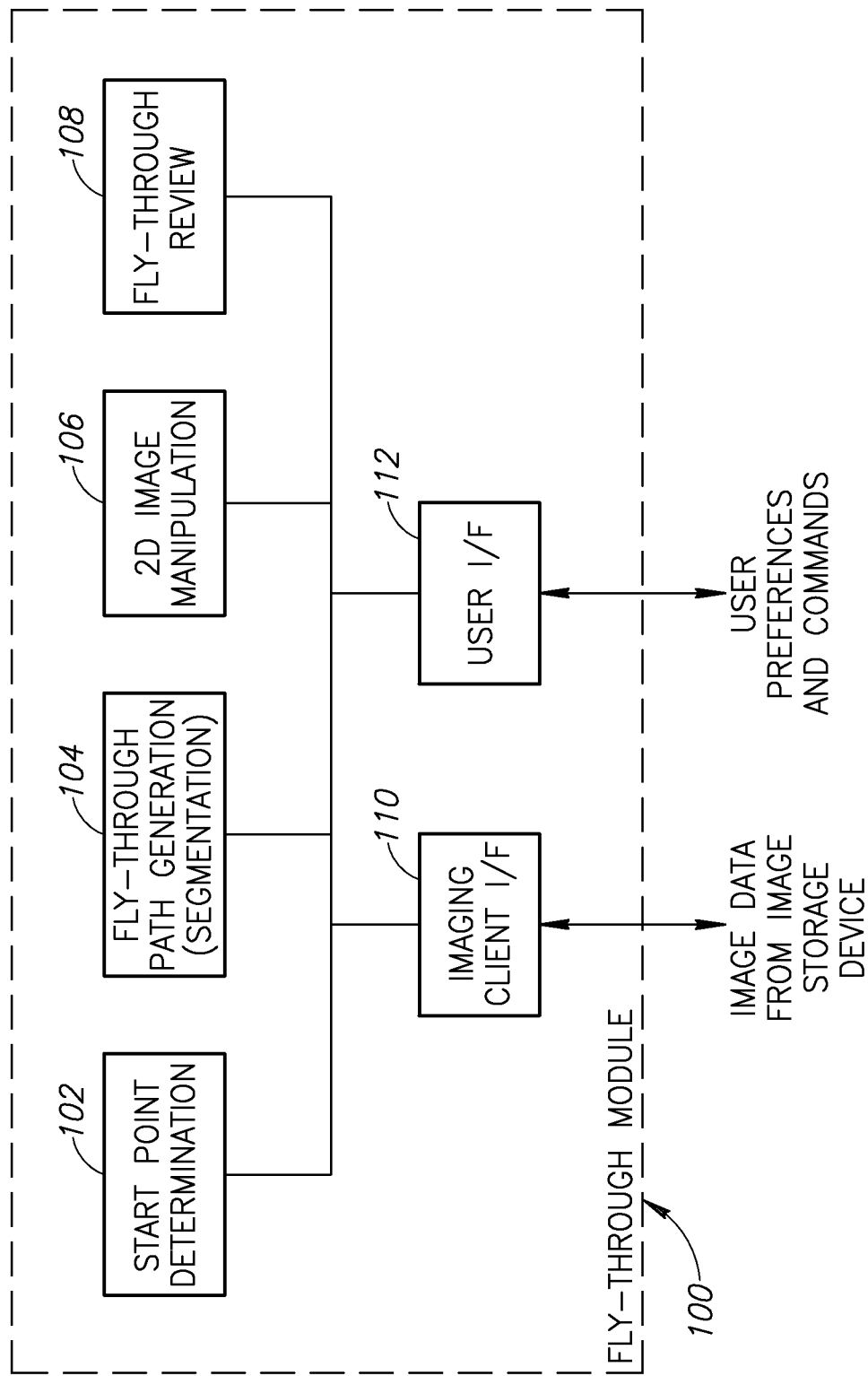
FIG. 6 is a functional block diagram illustrating an example computer processing system implementing the fly-through mechanism of the present invention.

A functional block diagram illustrating an example computer processing system implementing the fly-through mechanism of the present invention is shown in FIG. 6. The fly-through module, generally referenced 100, comprises a start point determining block 102, fly-through path generation block 104, 2D image manipulation block 106, fly-though review block 108, imaging client interface (I/F) block 110 and user interface block 112, all in communication with each other.

In operation, the start point determination block functions to obtain a start point for the review from the user or to generate one based on a path calculation. The fly-through path generator functions to calculate the review path using segmentation or other suitable known techniques. The 2D image manipulation block functions to apply rotation, scaling, translation operations to the display images in accordance with user parameters. The fly-through review process coordinates the review process and controls the display of frame images to the user. The imaging client I/F generates requests for and receives in response streaming image data from the remote imaging server. The user I/F handles requesting and receiving user commands, preferences and parameters to control the review process.

Fly-Through Path Calculation

Typical high resolution digital pathology slide scans are very large files. A slide scanned at ×40 magnification may have a size of 30 GB if not compressed using lossy compression methods. In a preferred embodiment, the scanned slide is stored using (1) a tiled multiresolution representation, such as a pyramid of JPEG tiles (still image data compression standard); (2) a compressed wavelet representation, or (3) using the JPEG2000 compression standard. From such a representation it is possible to extract only the relevant pieces of data that are needed to render at any resolution what is termed a region of interest (ROI).

Once the user selects to go perform a fly-through review and optionally, selects a start point for the review, a well-known segmentation algorithm is applied to compute the boundary and the fly-through path. In a preferred embodiment, a low resolution representation of the digital slide is extracted and the segmentation algorithm is applied at that resolution. As described supra, the computation of the fly-through path may be performed on the local client computer or on a backend server having a connection to the image storage unit where the image data is stored. Note that if requesting a compressed lower resolution image will not result in a huge data transfer, the computation can be performed on the local client workstation.

The segmentation may be computed using a variety of well-known techniques such as described in Digital Image Processing, $3^{rd}$ edition, R. Gonzalez and R. Woods, Pearson Education, 2008.

Figure 7:
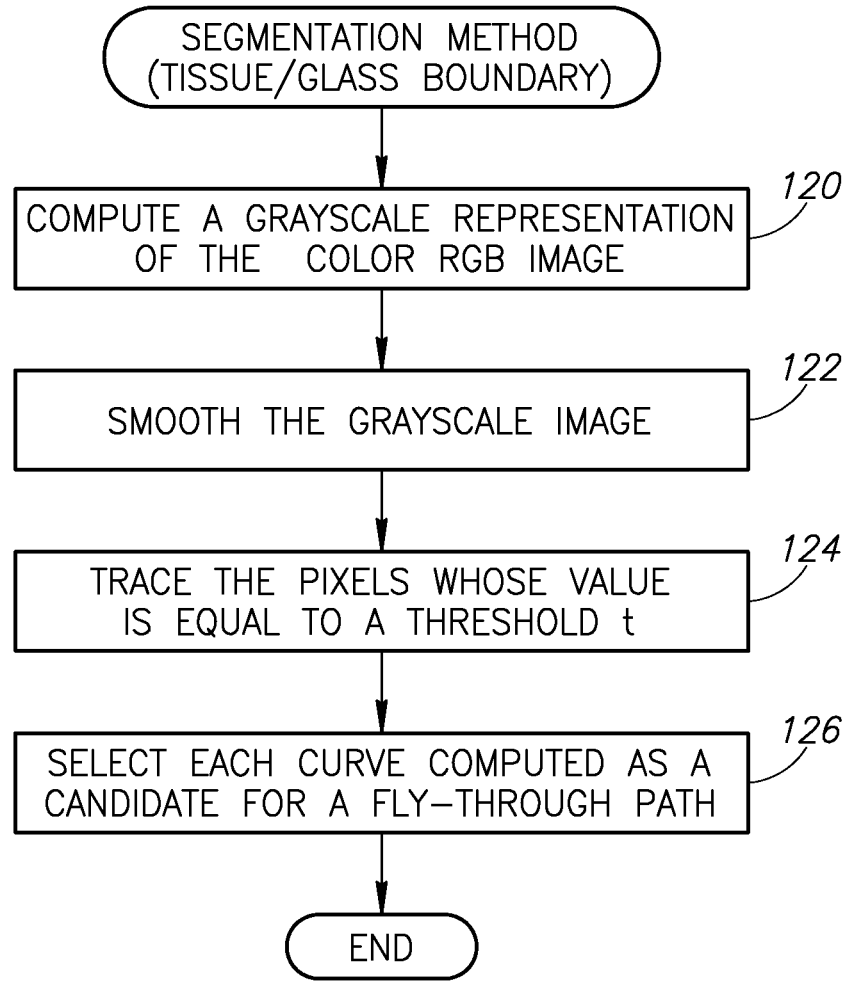
FIG. 7 is a flow diagram illustrating the tissue/glass boundary segmentation method of the present invention.

A flow diagram illustrating the tissue/glass boundary segmentation method of the present invention is shown in FIG. 7. In this example technique, to compute the tissue boundary, we exploit the fact that the pixel values of the tissue and glass (i.e. air) are very different.

First, a grayscale representation of the color RGB image is computed (step 120) by applying the following known transform:

$$Y=0.299 \times R+0.587 \times G+0.114 \times B \quad (1)$$

A low pass filter is then applied to smooth the grayscale image (step 122), using, for example, a Gaussian filter $$g(x_1, x_2) = \frac{1}{2\pi\sigma^2} e^{-\frac{x_1^2+x_2^2}{2\sigma^2}} \quad (2)$$

The pixels whose value is equal to some threshold t are then traced (step 124). Note that for a smooth image this is actually a collection of disjoint smooth curves. Each of the curves computed is a candidate for a fly-through path (step 126).

Figure 8:
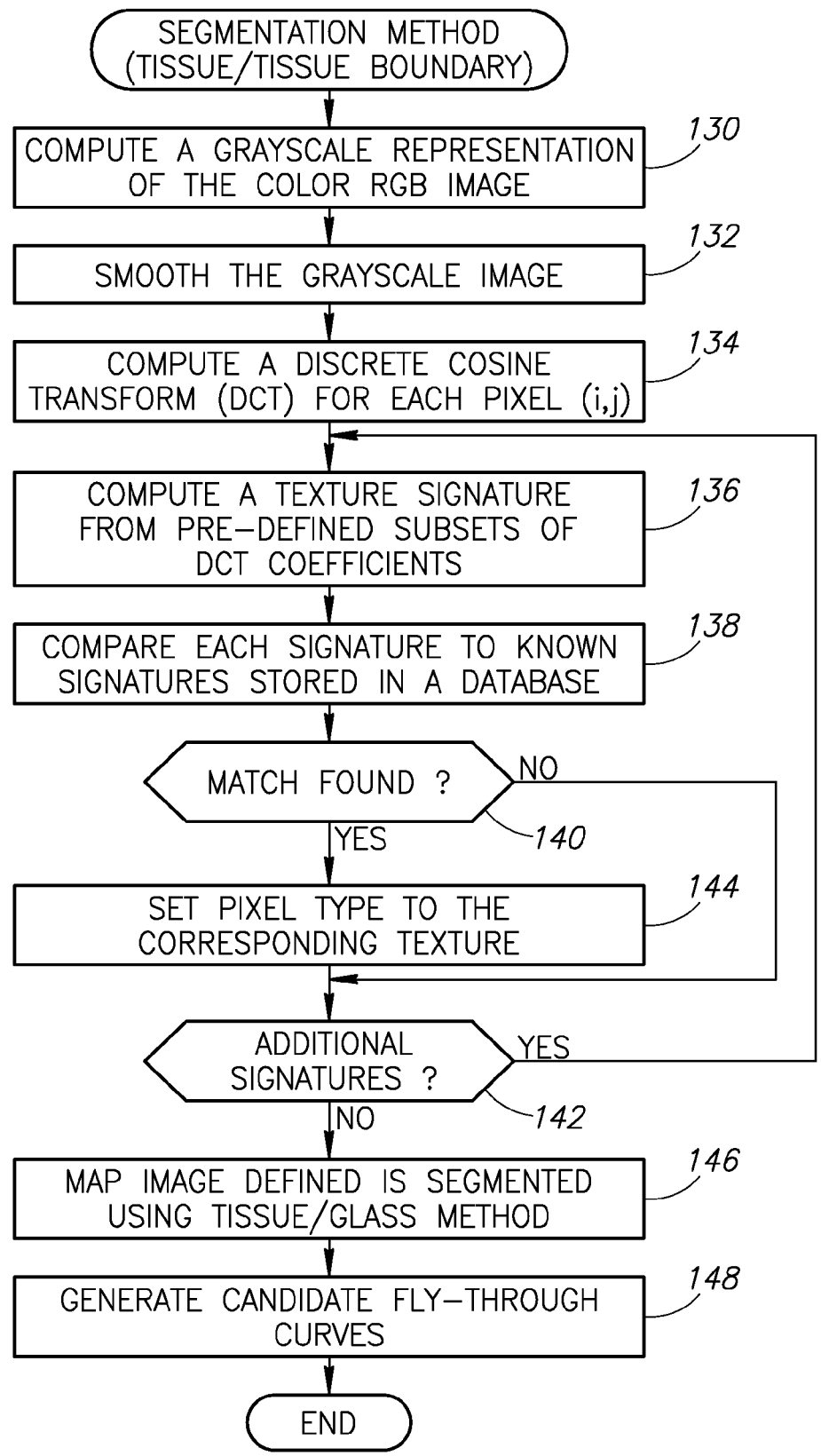
FIG. 8 is a flow diagram illustrating the tissue/tissue boundary segmentation method of the present invention.

A flow diagram illustrating the tissue/tissue boundary segmentation method of the present invention is shown in FIG. 8. In an alternative embodiment, when computing the border between two types of tissue (as opposed to tissue/air border), one needs to apply texture analysis methods, since simple straightforward thresholding is not sufficient. The first few steps of the tissue/tissue method of similar to that of the tissue/air method described supra. First, a grayscale representation of the color RGB image is computed using the transform of Equation 1 above (step 130). The grayscale image is smoothed such as by applying the Gaussian filter of Equation 2 (step 132).

Then, rather than trace pixels, for each pixel indexed by (i,j), a Discrete Cosine Transform (DCT) is computed within a small neighborhood of (i,j) with side length 2L+1, L≥4 (step 134)

$$\{(i',j'): i' \in [i-L, i+L], j' \in [j-L, j+L]\} \quad (3)$$

A texture signature is then computed from predefined subsets of the $(2L+1)^2$ DCT coefficients (step 136). In one embodiment the signature may simply comprise the sum of absolute values all coefficients, each corresponding to a different frequency, but all belonging to the same resolution.

The signature is compared to known signatures stored in a database (step 138). If a match is found (step 140), the pixel is declared to be of the corresponding texture type (step 144). Otherwise, the method continues comparing other signatures (step 142).

The map image defined by the assignment of a pixel index to a texture type can be considered as a simplified 'cartoon' image with only few limited possible values (equal to the number of texture types found). This simpler image can now be easily segmented using the tissue/air segmentation method described supra in connection with FIG. 7 (step 146) and candidate fly-through curves are extracted (step 148).

In an alternative embodiment, as mentioned supra, in some cases the segmentation can be computed on a low resolution version of the image. It is well known that low resolution images of high frequency textures are in fact smooth with almost uniform color. Thus, it is possible to extract segmentation between two tissues by extracting a low resolution and applying a well-known segmentation algorithm, without the need to perform texture analysis on the low resolution image.

Note that in the event that multiple candidate fly-through curves are found, the one that is closest to a user specified start point can be selected. In one embodiment, the mechanism renders a fly-through jumping from curve to curve and rendering all of them. During a fly-through of several border curves, the user 'skips' a fly-through of an entire curve using a 'skip' control. In another embodiment, the user is able to edit the order of rendering of the curves and to optionally edit the actual geometry of each curve as well.

Visualization of the Fly-Through Path

Figure 1:
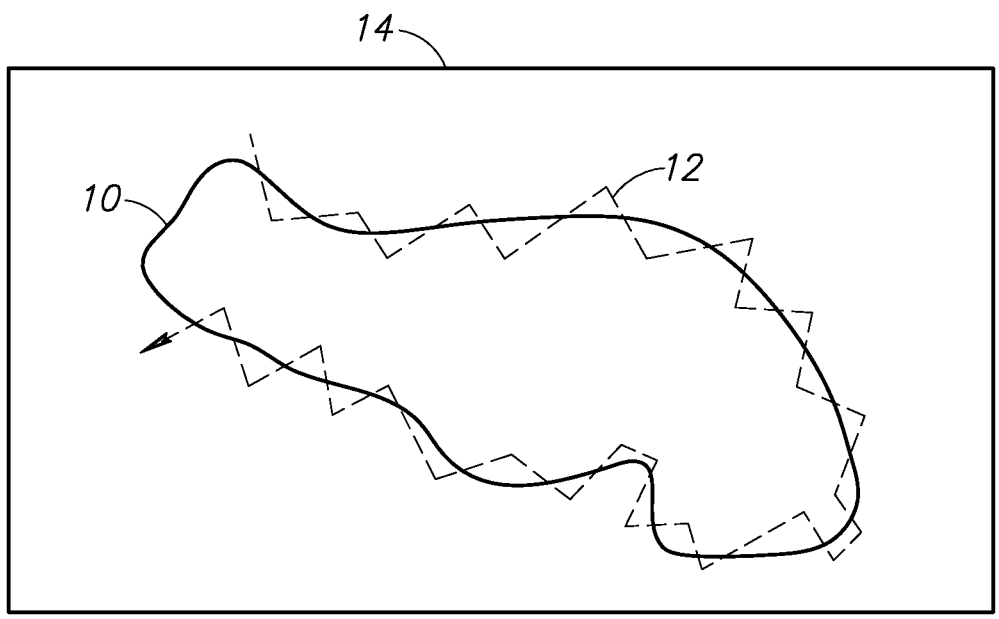
FIG. 1 is a block diagram illustrating an example zigzag scan performed by a pathologist around the boundary of a tissue sample.
Figure 2:
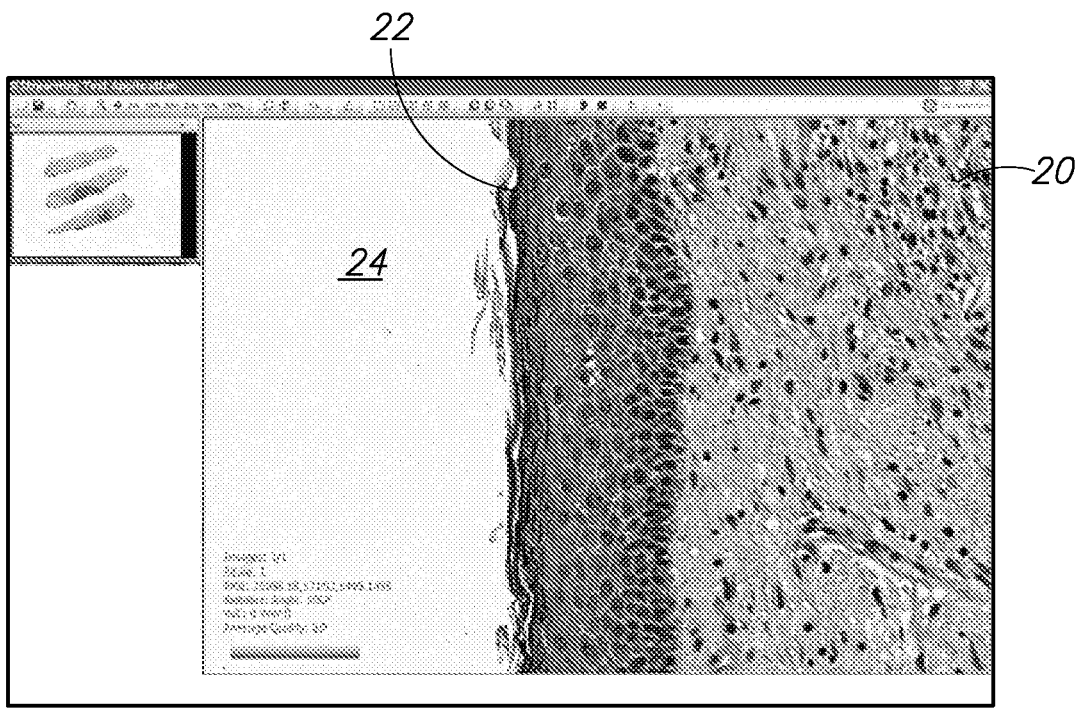
FIG. 2 is a high resolution digital scan of the boundary area of a tissue sample.

During the fly-through process, segmentation algorithm is used to determine the path of the review. In accordance with the path, frame images to be displayed are generated which make up the content of the review. The displayed frame images are automatically rotated and aligned according to user preferences. In one embodiment, the tissue boundary is vertically aligned and the tissue occupies a predetermined portion of the screen as shown in FIG. 2. In another embodiment, the user may prefer that the image is not automatically rotated.

Figure 9:
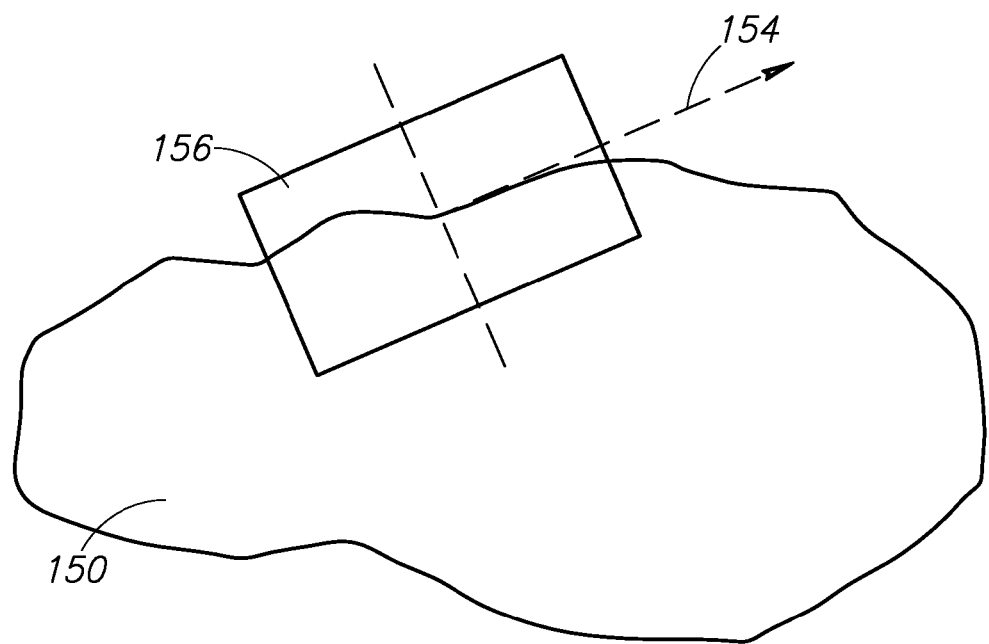
FIG. 9 is a diagram illustrating an example rotated fly through frame image.

To achieve this, the client workstation determines the ROI parameters based on the fly-through path. A diagram illustrating an example rotated fly through frame image is shown in FIG. 9. As illustrated, the center of the ROI frame 156 is the current location of the fly-through path. The orientation can be determined from the path trajectory (i.e. the tangent vector 154) while the scale of the ROI is determined from one or more user preferences. In one embodiment, the user is able to override this fully automatic mode and dynamically change the automatic ROI parameters on-the-fly.

Figure 10:
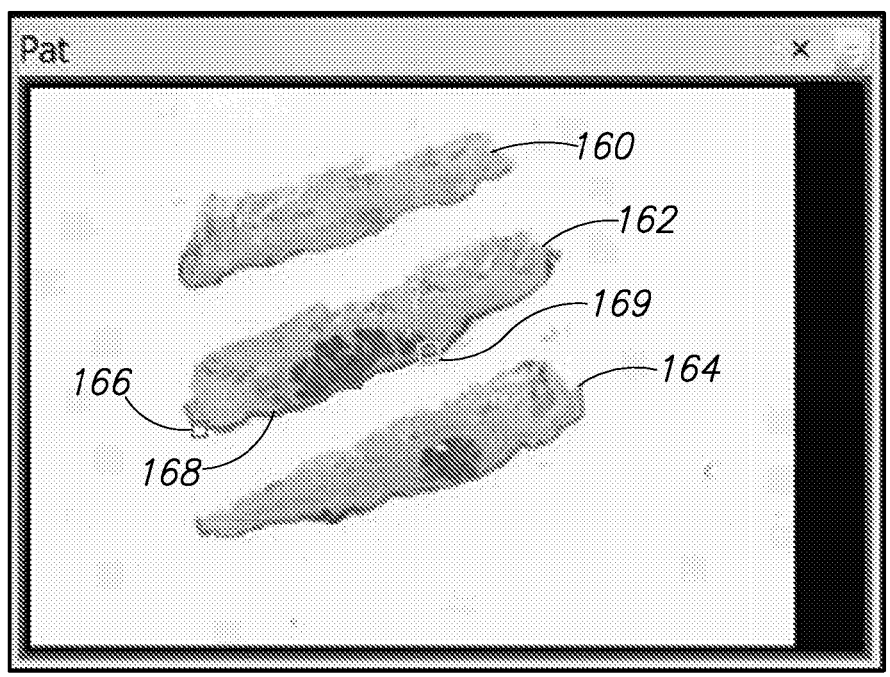
FIG. 10 is an example thumbnail view of a slide.

In one embodiment, the high magnification location in the fly-through review is indicated in a low magnification rendering (i.e. thumbnail view) of the slide as shown in FIG. 10, which illustrates three tissue sample scans 160, 162, 164. A graphical overlay is added to the middle sample 162 indicating which portions of the border have been reviewed in the current fly-through review session. In particular, box 166 indicates the starting point of the review, line 168 indicates the fly-through path already traversed and box 169 indicates the current position of the fly-through review.

Visual Image Data Streaming

As stated supra, in a preferred embodiment, the scanned slide image data is stored using a tiled multiresolution representation which permits the extraction of only the relevant pieces of data needed to render the sequence of ROI frames composing the fly-through sequence. The data is extracted having a specified quality (i.e. resolution) depending on the bandwidth available between the client and the image server (or image storage device).

The image streaming technique eliminates the necessity to store a compressed version of the original image, by streaming a sequence of so called region of interest (ROI) data using the original stored image. Once a user wishes to perform a fly-through on a particular image, the imaging server performs a fast preprocessing step in near real time after which it can respond to any ROI requests in near real time. When a ROI request arrives at the server, an image encoding algorithm is performed only for the ROI, and not the full image. Since the size of the ROI is bounded by the size and resolution of the viewing device at the client and not by the size of the image, only a small portion of the full coding computation is performed for a local area of the original image. This local property is also true for the client. The client computer performs decoding and rendering only for ROI and not the full image. The streaming imaging mechanism is based on wavelet transforms.

In a preferred embodiment, the viewer requests those data blocks needed for the decoding and rendering of the fly-through from the backend server (i.e. imaging server 48, FIG. 3). As is done such as in internet video players, the client workstation buffers in memory ahead of time the pixels to be rendered, such that when a certain region is to be rendered, it will already be present in the memory of the client workstation with decoding and other image processing functions already applied.

In a preferred embodiment, the client and server communicate using a protocol of data blocks such as described below. The client then decodes the data blocks and renders to memory pixel tiles of the fly-through strip about to be rendered.

Figure 11:
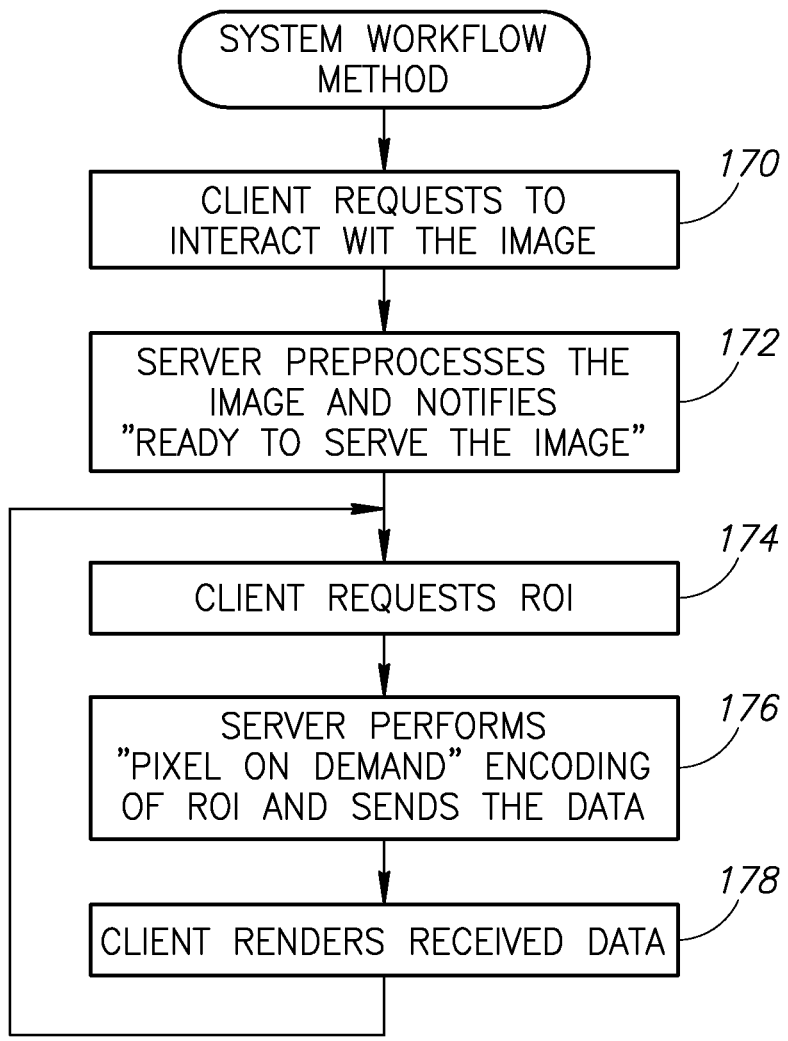
FIG. 11 is a flow diagram illustrating an example system workflow method for streaming visual path display data from an imaging server.

A flow diagram illustrating an example system workflow method for streaming visual path display data from an imaging server is shown in FIG. 11. In one embodiment, using any browser or other type of application (e.g., imaging client), the client computer 32 (FIG. 3) connects to a web server 42 or directly to the imaging server 48. The user then selects, such as using common browser tools, an image residing on the image file storage device 46 (step 170). The corresponding URL request is received and processed by the imaging server. In the case where the results of previous computations on the image are not present in the imaging cache 52, the imaging server 48 performs a fast preprocessing algorithm. The result of this computation is inserted into the cache 52.

The preprocessing step 172 allows the imaging server 48, after a relatively fast computational step, to serve any ROI specified by the user of the client computer 32. Serving an ROI is described herein as Pixels-On-Demand, which identifies a transmission of any ROI of the image essentially in real-time at a particular quality. Typically, the data is sent with a particular quality. The same data with improved quality me be transmitted in cases such as where the user pauses during the fly-through thereby providing additional time for higher quality image data to be transmitted.

The quality of the image data transmitted varies with the available bandwidth. If the available bandwidth is relatively high, the data is sent at its final quality (or close to it). On the other hand, if the available bandwidth is relatively low, the data is sent at a lower quality that is suitable for the bandwidth of the link. In either case, only the data needed (i.e. specific ROIs) to display the current portion of the fly-through is pulled from the image server (or directly from the image storage device) and transmitted to the client.

Thus, assuming a reasonable available bandwidth, the frames are rendered at the highest quality. Over low bandwidth, the quality of the fly through is likely lower. If the user pauses the fly through, then progressive streaming to lossless quality is performed.

Once the preprocessing stage is complete, the imaging server 48 sends a notification to the client 32 that the image is ready to be served. The imaging server also transmits the basic parameters associated with the image such as dimensions, color space, etc. Upon receiving this notification, the client can select any ROI of the image using a standard graphical user interface (GUI).

The ROI is formulated in step 174 by the client computer into a request list that is sent to the imaging server. Each such request corresponds to a data block (described in more detail infra) In the case of the availability of a fast network, only the ROI frames are streamed without the use of any progressive techniques. In an alternative embodiment, the order of requests in the list corresponds to a progressive mode selected in the context of the application, such as progressive by accuracy, resolution or spatial order rendering of the ROI.

Upon receiving the ROI request list, the imaging server processes the requests according to their order. For each such request, the imaging server checks if the corresponding data block already exists in the imaging server cache 52. If not, the imaging server then computes the data block, stores it in the imaging server cache and immediately sends it to the client (step 176). Once a data block that was requested arrives at the client, it is inserted into the imaging cache 34. At various points in time during the transfer process, a decision rule invokes a rendering of the ROI by the client (step 178).

In case the user changes the ROI, the rendering task at the client computer is canceled and a new request list corresponding to a new ROI, sent from the client to the imaging server, will notify the imaging server to terminate the previous computation and transmission task and begin the new one.

An imaging protocol serves as a common language between the imaging server and client computer and is mainly used for the following purposes: (1) by the client computer to efficiently stream to the imaging server an ordered request list of data blocks required for rendering of a given sequence of ROIs; and (2) by the imaging server to efficiently compose and send to the client computer a stream of (requested) data blocks.

Both client computer and imaging server use the same distributed database associated with the protocol, such that they are using the same tagging system for the various data blocks. Using this approach it is also possible to cache the data blocks at both ends.

The imaging server is able to cache (in imaging server cache 52) any computed data block, such that this data block can be sent to any client that requests it. The client is able to cache (in imaging cache 34) any data block received, such that for any subsequent ROI rendering operation requiring the data block, it will be extracted from the client imaging cache and not ordered from the imaging server.

The basic components of the protocol are accuracy layers associated with tiles of subband/wavelet coefficients. To illustrate, suppose I(x, y) is a given single component image such as a grayscale image (the protocol can be generalized to arbitrary color spaces). Let FWT(I) (Forward Wavelet Transform) be a subband/wavelet transform of the image, transforms of which are well-known in the art.

Figure 12:
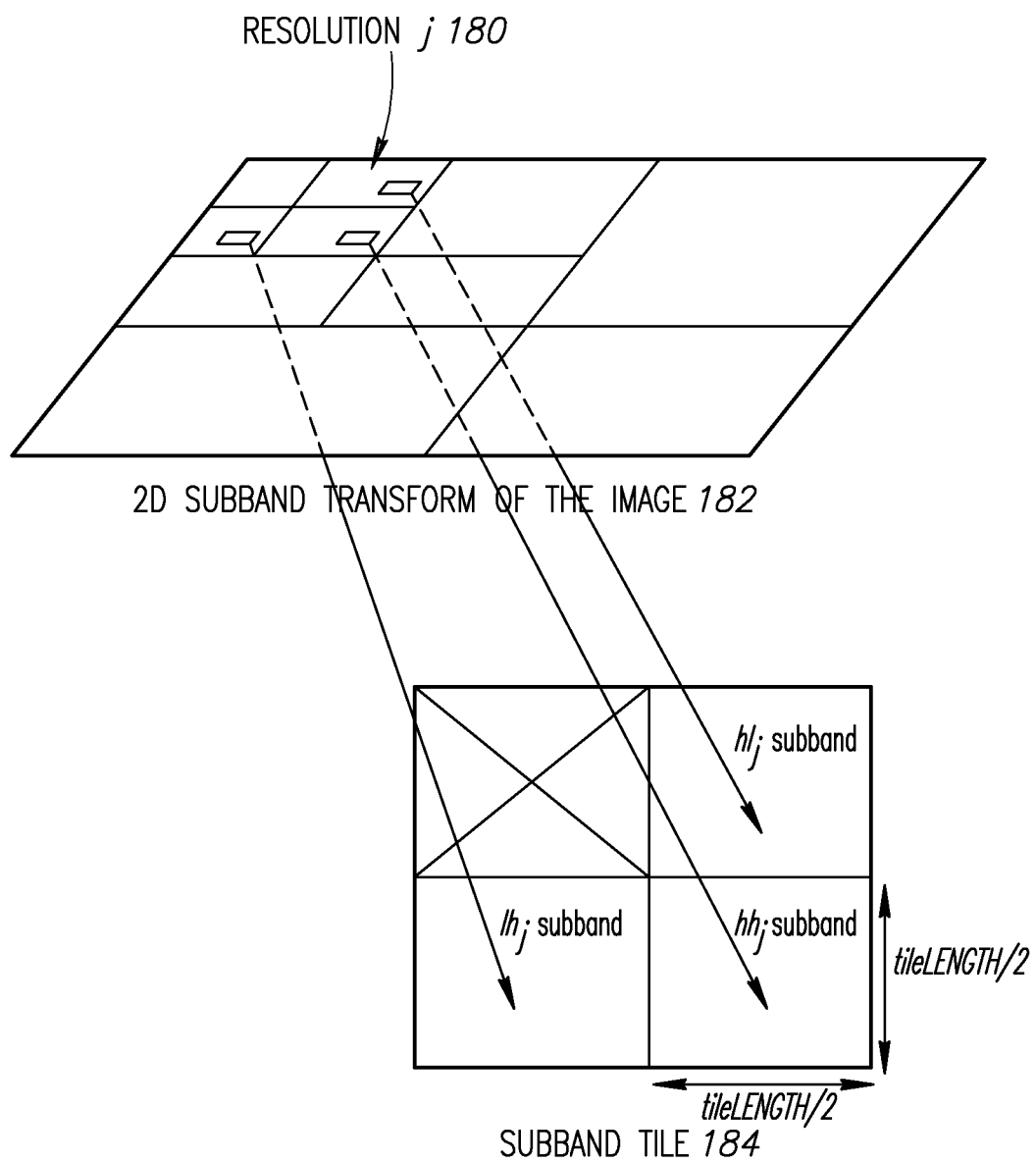
FIG. 12 is a diagram illustrating the spatial grouping of subband coefficients at a given resolution for a subband tile.

It is required that the transform be separable. A 2D separable transform can be computed by two 1D steps: in the X direction followed by the Y direction of the given image. A diagram illustrating the spatial grouping of subband coefficients at a given resolution for a subband tile is shown in FIG. 12. The transform typically creates for each given resolution/frequency j three subbands denoted as $hl_j$, $lh_j$, $hh_j$. Thus, we can associate the coefficients of FWT(I) with the structure 182. Observe that each coefficient belongs to a certain resolution 180. Also, if a Finite Impulse Response (FIR) subband filter (compactly supported wavelet) is used, each coefficient influences only a compactly supported region of the image. High resolution/frequency coefficients are associated with a small region and low resolution/frequency coefficients are associated with a larger region.

For the purpose of efficient rendering, the coefficients may be subdivided into the tiles 184. Three subgroups of coefficients corresponding to subbands $hl_j$, $lh_j$, $hh_j$ at the resolution j, associated with the same spatial area are grouped into each tile. Typically the sub-tiles are chosen to have a length of 32, so that the tile contains $3 \times 32^2$ coefficients. This relates to the fact that at the time of rendering at the client computer, the subband tile will provide a means to render a tile of length 64. A parameter tileLength controls the length of the subband tiles 184 and can be changed dynamically per image. To each such tile 184 we associate a 3D coordinate $$(t\_x, t\_y, t\_resolution) \quad (4)$$

The further decomposition of subband tiles to subband data blocks will now be further explained. The motivation for this finer 4D decomposition is this: Each subband tile at the resolution j participates in the rendering of local regions in all the resolutions≥j. Assume j corresponds to a very low resolution. For a high quality rendering of a given ROI at the resolution j, only the coefficients with high absolute value are required. Transmitting small coefficients will not have any significant visual effect at the time of rendering, and thus are avoided. Also, transmitted coefficients need not be sent at a high precision since this also will have visual significance to the rendering operation. Rather, for each such significant coefficient only a few bits of precision need be transmitted along with the coefficient's sign. Rendering the same ROI at a higher quality or rendering a higher resolution will require sending of more of the tile's coefficients and also more accuracy bits for the coefficients that were already sent. For this reason, each subband tile is further decomposed into accuracy data blocks. Each data block is associated with the "bit plane" interval [0, 2) at level 0, or the intervals $(2^l, 2^{l+1})$ at level $l \geq 1$.

Figure 13:
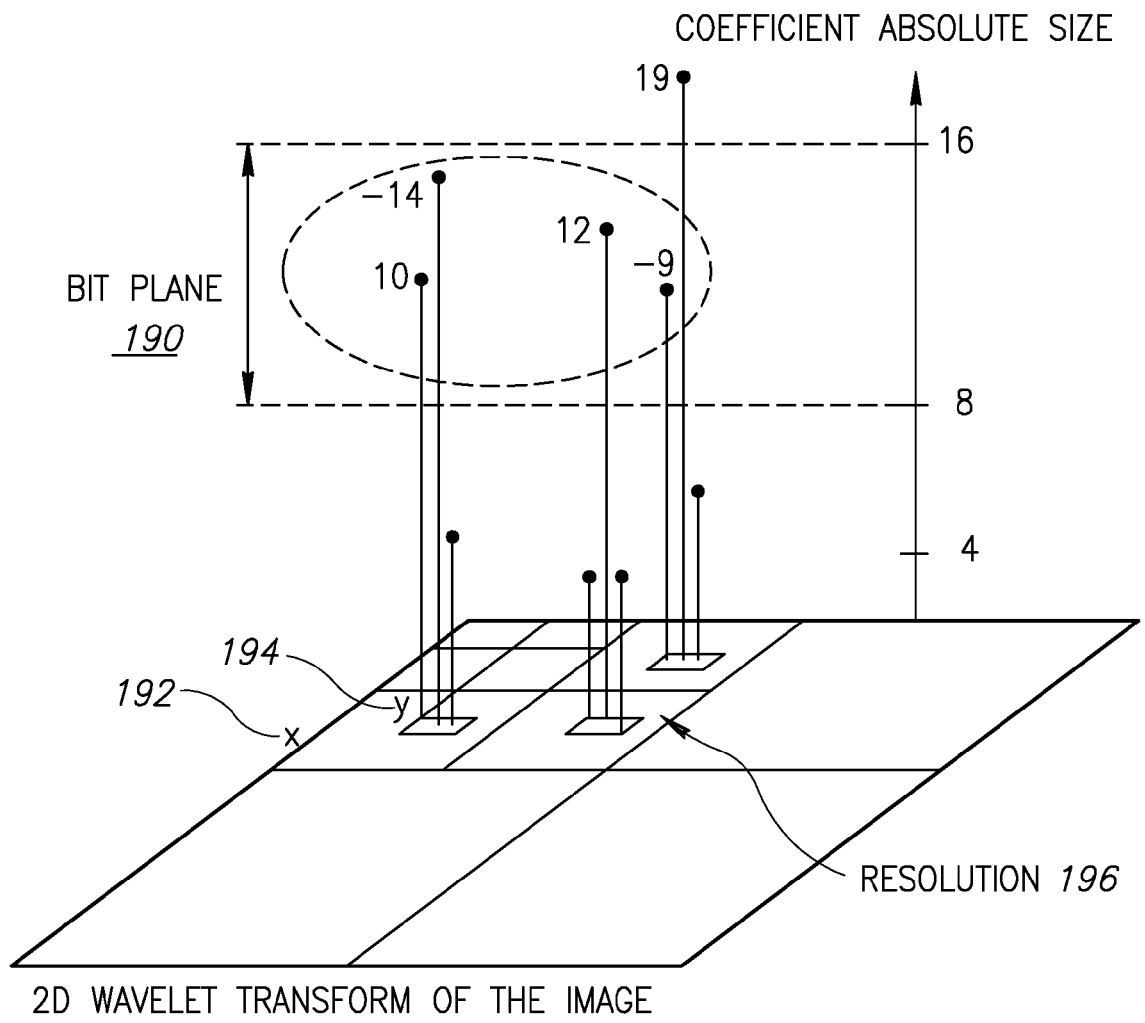
FIG. 13 is a diagram illustrating the visualization of a data block having x, y resolution and bit plane dimensions.

A diagram illustrating the visualization of a data block having x, y resolution and bit plane dimensions is shown in FIG. 13. Each data block of the subband tile (Equation 4) has a 4D coordinate $$(t\_x, t\_y, t\_resolution, t\_bitplane) \quad (5)$$

where $0 \leq t\_bitplane \leq maxBitPlane(t\_resolution)$. Note that x, y, resolution and bit plane are depicted in FIG. 13 as reference numerals 192, 194, 196 and 190, respectively. The value of maxBitPlane(t_resolution) corresponds to a predetermined constant or is selected dynamically according to the largest coefficient at the resolution t_resolution of the given image. For example, maxBitPlane(t_resolution)=8 works well on most images. Utilizing a well known bit plane technique, a data block having the coordinates described above at (1.2) contains the following data in encoded format:

1. For t_bitPlane>0, a list of the indices of all subband coefficients whose absolute value is in the range $(2^{t\_bitPlane}, 2^{t\_bitPlane+1})$.
2. The sign of all the coefficients of 1.
3. In some cases an additional precision bit is added for any coefficient that belongs to the current bit plane or any higher bit plane.

It may be noted that:

1. In case the subband tile has coefficients whose absolute value$\geq 2^{maxBitPlane(t\_resolution)+1}$, where maxBitPlane (t_resolution) is not dynamically selected, their bit plane information, which is the most significant, is inserted into the "highest" possible data block $$(t\_x, t\_y, t\_resolution, maxBitPlane(t\_resolution)) \quad (6)$$

In such a case, this most significant data block contains the data of possibly several bit planes.

2. In lossy image coding, it is preferable to threshold (discard) all coefficients whose absolute value is below some given threshold $\epsilon > 0$. In such a case each data block having the coordinates identified above at (Equation 5) is associated with the bit plane. Observe that coefficients whose absolute value is smaller than .epsilon. are not reported in any data block and therefore never transmitted.

3. There are cases where different thresholds were chosen for different types of coefficients. This might be done internally by a preprocess stage before the encoding algorithm, or externally in the case where the original image is a JPEG image already containing encoded quantized subband coefficients. In such a case, $\epsilon$ is chosen as the minimal threshold. Yet all the threshold values are used in the coding algorithm to predetermine the significance of a coefficient at a certain bit plane $(\epsilon 2^{t\_bitPlane}, \epsilon 2^{t\_bitPlane+1})$ and improve the coding efficiency. Furthermore, if a coefficient is known to be quantized, it can be handled more efficiently by the coding algorithm, and transmission of fine precision data can be avoided. This can be achieved by equipping the coding algorithm with the knowledge of the given quantization scheme.

4. A simple generalization of the above for more than one component can be performed by associating the coefficients of all components of a tile in the same absolute value range with the same data block. However, this might not be efficient in the case where one component is visually more significant than others. This is when the original image pixels are converted from their original color space into a coding color space such as $YC_B C_R$, YUV or YIQ. In these color spaces, the Y component represents the luminance of the color image and thus is more visually significant than the other two components which represent the color information. Furthermore, in lossy coding one typically applies smaller threshold to the luminance component. In such a case, assuming the coefficients of each component c are thresholded with $\epsilon_c > 0$, we insert to the data block (Equation 5) with t_bitPlane≥0, for each component c, all of the coefficient data associated with the bit plane interval ($\epsilon 2^{t\_bitPlane}$, $\Box_c 2^{t\_bitPlane+1}$). This allows the imaging server to transmit for each ROI more data for visually significant components and less data for other components.

Figure 14:
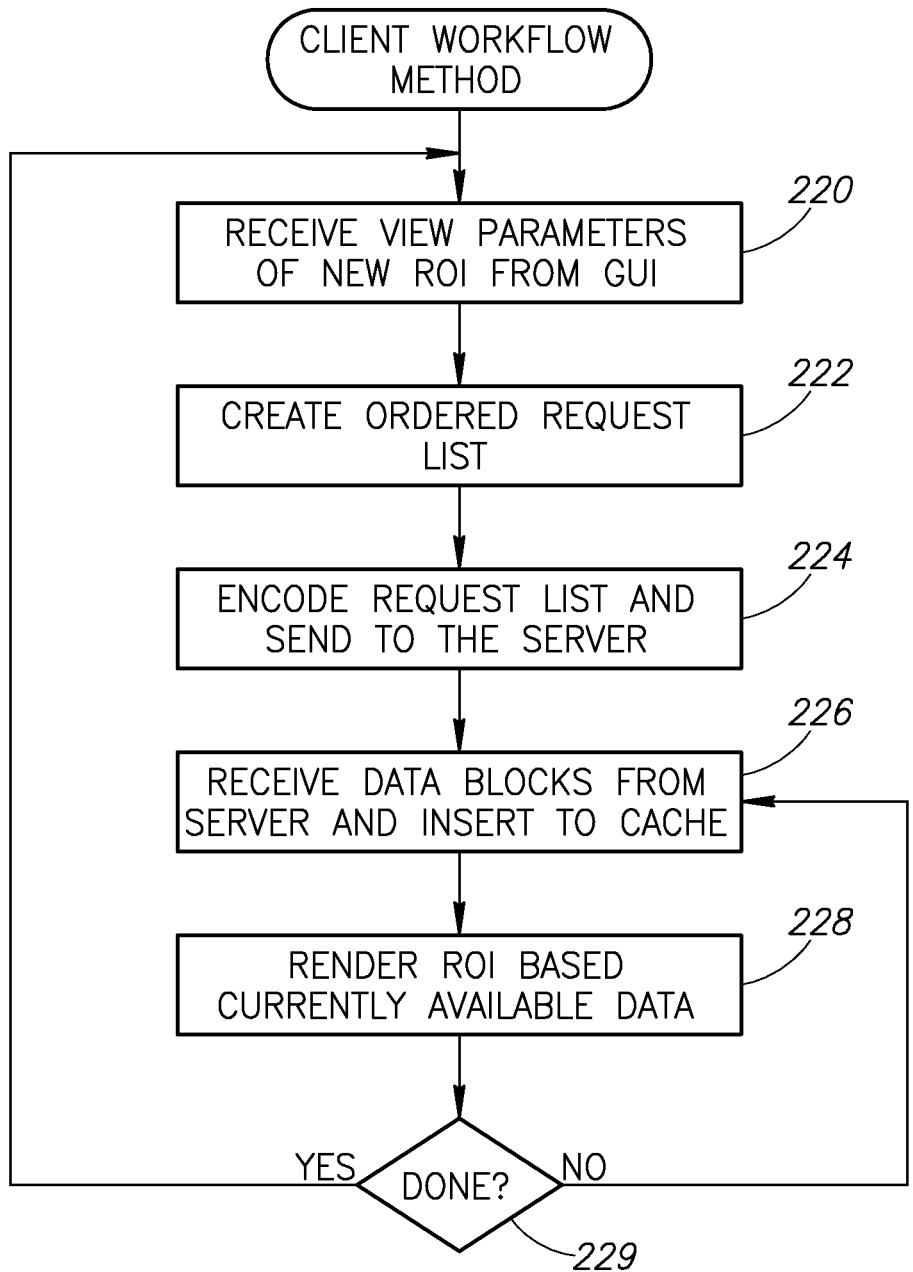
FIG. 14 is a flow diagram illustrating a streaming process for a client.

A flow diagram illustrating a streaming process for a client is shown in FIG. 14. The workflow at the client computer will now be described. Any new ROI generated in response to user action (or fly-through review process), such as a zoom-in or a scroll, invokes a call from the GUI interface to the client imaging module with the new ROI view parameters (step 220). The client imaging module then computes which data blocks are required for the rendering of the ROI, and checks if these data blocks are available in the client imaging cache 34 (FIG. 3) (step 222). If they are not available, their coordinate (Equation 5) is added to a request list. The request list is then encoded and sent to the imaging server 48 (step 224).

The imaging server responds to the request by sending back to the client computer a stream of data blocks, in the order in which they were requested (step 226). The client computer inserts them to their appropriate location in the distributed database (i.e. imaging cache 34). At various points in time, a rendering of the ROI is invoked (step 228). Note that the rendering operation uses the currently available data in the client's database. Further ROI requests are handled similarly (step 229).

The imaging client on the client computer receives from the GUI interface module view parameters detailed in Table 1. These parameters are used in step 222 to generate a request list for the ROI. The same parameters are used to render the ROI in step 228.

TABLE 1

View Parameters

| Variable | Definition |
| --- | --- |
| worldPolygon | A 2D polygon in the original image coordinate system |
| scale | The view resolution. 0 < scale < 1 implies a low view resolution, scale = 1 original resolution and scale > 1 a higher than original view resolution |
| deviceDepth | A number in the set {8, 16, 24} representing the depth of the output device (screen, printer) |
| viewQuality | A quality factor in the range [1, 7] where 1 implies very low quality and 7 implies lossless quality |
| luminanceMap | If active: a curve defining a mapping of medical images with more than 8 bits (typically 10, 12, 16 bits) per grayscale values to an 8 bit screen |

The basic parameters of a ROI are worldPolygon and scale which determine uniquely the ROI view. If the ROI is to be rendered onto a viewing device with limited resolution, then a worldPolygon containing a large portion of the image will be coupled by a small scale. The other view parameters determine the way in which the view will be rendered. The parameters deviceDepth and viewQuality determine the quality of the rendering operation. In cases the viewing device is of low resolution or the user sets the quality parameter to a lower quality, the transfer size can be reduced significantly.

The parameter luminanceMap is typically used in medical imaging for grayscale images that are of higher resolution than the viewing device. Typically, screens display grayscale images using 8 bits, while medical images sometimes represent each pixel using 16 bits. Thus, it is necessary to map the bigger pixel range to the smaller range of [0,255].

In step 222, using the ROI view parameters, the imaging client module at the client computer calculates data blocks request list. Given the parameters worldPolygon and Scale, it may be determined which subband tiles (Equation 4) in the "frequency domain" participate in the reconstruction of the ROI in the "time domain". These tiles contain all the coefficients that are required for an "Inverse Subband/Wavelet Transform" (IWT) step that produces the ROI.

First, the parameter dyadicResolution (ROI) is computed, which is the lowest possible dyadic resolution higher than the resolution of the ROI. Any subband tiles of a higher resolution than dyadicResolution (ROI) do not participate in the rendering operation. Their associated data blocks are therefore not requested, since they are visually insignificant for the rendering of the ROI. If scale≥1, then the highest resolution subband tiles are required. If scale≤$2^{1-numberOfResolutions}$ then only the lowest resolution tile is required. For any other value of scale we perform the mapping described below in Table 2.

TABLE 2

| Scale Mapping | |
| --- | --- |
| scale | highestSubbandResolution |
| scale ≤ $2^{1-numberOfResolutions}$ | 1 |
| $2^{1-numberOfResolutions}$ < scale ≤ 1 | numberOfResolutions - $\lfloor -\log_2(\text{scale}) \rfloor$ |
| scale > 1 | numberOfResolutions |

Once it has been determined which subband tiles participate in the rendering of the ROI, it is necessary to find which of their data blocks are visually significant and in what order they should be requested. Using well-known rate/distortion rules from the field of image coding, an optimal order in which the data blocks should be ordered by the client imaging module is determined (and thus delivered by the imaging server). The underlying mathematical principal behind this approach is "Non-Linear Approximation".

First, the subband coefficients with largest absolute values are requested since they represent the most visually significant data such as strong edges in the image. Note that high resolution coefficients with large absolute value are requested before low resolution coefficients with smaller absolute value. Within each given layer of precision (i.e. bit plane) the order of request is according to resolution; low resolution coefficients are requested first and the coefficients of highestSubbandResolution are requested last.

In step 224, the imaging client module in the client computer encodes the request list into a request stream which is sent to the imaging server via the communication network 40 (FIG. 3). The request list encoding algorithm is a rectangle-based procedure. The heuristics of the algorithm is that the requested data block usually can be grouped into data block rectangles. From the request list of data blocks indexed by (Equation 5) the encoding algorithm computes structures of the type $$\{(t\_x, t\_y, t\_resolution, t\_bitplane), n_x, n_y\}, n_x, n_y \geq 1 \qquad (7)$$

Each such structure represents the $n_x \times n_y$ data blocks $$\{(t\_x+i, t\_y+j, t\_resolution, t\_bitplane)\}, 0 \leq n_x, 0 \leq j < n_y \quad (8)$$

The encoding algorithm attempts to create the shortest possible list of structures of type (Equation 7) which can be done by collecting the data blocks to the largest possible rectangles. It is important to note that the algorithm ensures the order of data blocks in the request list is not changed, since the imaging server will respond to the request stream by transmitting data blocks in the order in which they were requested. An example of when this works well is when a user zooms in into a ROI at a high resolution that was never viewed before. In such a case, the request list may be composed of hundreds of requested data blocks, but they will be collected to one (x, y) rectangle (Equation 7) for each pair (t_resolution, t_bitPlane).

In step 226, the client computer, upon receiving from the imaging server an encoded stream containing data blocks, decodes the stream and inserts the data blocks into their appropriate location in the distributed database using their ID as a key. The decoding algorithm performed here is a reversed step of the encoding process. Since the client computer is aware of the order of the data blocks in the encoded stream, only the size of each data block need be reported along with the actual data. In case the imaging server informs of an empty data block, the receiving module marks the appropriate slot in the database as existing but empty.

Recall that the subband tile associated with each data block is denoted by the first three coordinates of the four coordinates of a data block (t_x, t_y, t_resolution). From the subband tile's coordinates the dimensions are calculated of the area of visual significance; that is, the portion of the ROI that is affected by the subband tile. Assume that each subband tile is of length tileLength and that the wavelet basis used has a maximal filter size maxFilterSize, then defining hFilterSize:= [maxFilterSize/2] and factor:=numberOfResolutions−t_resolution+1, we have that the dimensions of the affected region of the ROI (in the original image's coordinate system) are $$[t\_x \times tileLength^{factor} - hFilterSize^{factor}, (t\_x+1) \times tileLength^{factor} + hFilterSize^{factor}] \times [t\_y \times tileLength^{factor} - hFilterSize^{factor}, (t\_y+1) \times tileLength^{factor} + hFilterSize^{factor}] \quad (9)$$

These dimensions are merged into the next rendering operation's region. The rendering region is used to efficiently render only the updated portion of the ROI.

During the transmission of ROI data from the imaging server to the client, the client performs rendering operations of the ROI. To ensure that these rendering tasks do not interrupt the transfer, the client may run two program threads: communications and rendering. The rendering thread runs in the background and draws into a pre-allocated "off-screen" buffer. Only then does the client use device and system dependent tools to output the visual information from the off-screen to the rendering device such as the screen or printer.

The rendering algorithm performs reconstruction of the ROI at the highest possible quality based on the available data at the client. That is, data that was previously cached or data that just arrived from the imaging server. For efficiency, the rendering is performed only for the portion of the ROI that is affected by newly arrived data; specifically, data that arrived after the previous rendering task began. This updated region is obtained using the method of step 226, described supra.

The parameters of the rendering algorithm are composed of two sets: (1) the ROI parameters described in Table 1; and (2) the parameters transmitted from the imaging server.

The rendering algorithm computes pixels at the dyadic resolution dyadicResolution (ROI). Recall that this is the lowest possible dyadic resolution which is higher than the resolution of the ROI. The obtained image is then resized to the correct resolution.

Using a tiling of the multiresolution representation of the ROI, the steps of the algorithm are performed on a tile by tile basis. Since the tiles' length are tileLength, which is typically chosen as 64, the rendering algorithm is memory efficient. This is especially important in printing mode, when the rendered ROI may actually be a proof print (low) resolution of the full image.

As ROI data is transmitted to the client, the rendering algorithm is performed at certain time intervals of a few seconds. At each point in time, only one rendering task is performed for any given displayed image. To ensure that rendering does not become a bottleneck, two rates are measured: the data block transfer rate and the ROI rendering speed. If it predicted that the transfer will be finished before a rendering task, a small delay is inserted, such that rendering will be performed after all the data arrives. Therefore, in a slow network scenario (as the Internet often is), for almost all of the rendering tasks, no delay is inserted. With the arrival of every few kilobytes of data, containing the information of a few data blocks, a rendering task visualizes the ROI at the best possible quality. In such a case the user is aware that the bottleneck of the ROI rendering is the slow network and has the option to accept the current rendering as a good enough approximation of the image and not wait for all the data to arrive.

Subband coefficients are efficiently stored in memory during the rendering algorithm in a data structure. This is required since the coefficients are represented in long integer (lossless coding mode) or floating-point (lossy coding mode) precision which typically require more memory than pixel representation (1 byte). In lossy mode, the coefficients at the client side 110 are represented using floating-point representation, even if they were computed at the server side 120 using an integer implementation. This will minimize round-off errors.

Beginning with the lowest resolution 1, the algorithm proceeds with a recursive multiresolution march from the top of the ROI to bottom (y direction). Multiresolution strips are filled with sub-tiles of coefficients decoded from the database or read from the memory cache. From the coefficients we obtain multiresolution pixels using an inverse subband transform. Each time a tile of pixels at resolutions j<dyadicResolution(ROI) is reconstructed, it is written into the pixel strip at the resolution j. Each time a tile of pixels at the highest resolution dyadicResolution (ROI) is reconstructed, an inverse color transform and resizing step is performed.

The subband coefficients data structure is filled on a tile basis. Each such subband tile is obtained by decoding the corresponding data blocks stored in the database or reading from the memory cache. The memory cache is used to store coefficients in a simple encoded format. The motivation is that the decoding algorithm is computationally intensive and thus should be avoided whenever possible. To this end the rendering module uses a memory imaging cache 34 where subband coefficient are stored in very simple encoded format which decodes very fast. For each required subband tile, the following extraction procedure is performed. If no data blocks are available in the database for the subband tile, its coefficients are set to zero. If the tile's memory cache storage is updated, namely it stores coefficients in the same precision as in the database, then the coefficients can be efficiently read therefrom. The last possibility is that the database holds the subband tile in higher precision. Then, the tile is decoded down to the lowest available bit plane and the cached representation is replaced with a representation of this higher precision information.

An inverse subband transform is then performed on the imaging server. Four extended subband coefficient sub-tiles of length tileLength/2+maxFilterSize at the resolution j are read from the coefficient strips data structure and transformed to a tile of pixels at the next higher resolution using subbandTransformType(j). If j+1<dyadicResolution(ROI), the tile of pixels obtained by this step is inserted into the pixel memory strip at the resolution j+1. If j+1=dyadicResolution (ROI), the tile of pixels is processed by the next step of color transform.

An inverse color transform is performed by the imaging server only for tiles of pixels at the resolution highestSubbandResolution. At this stage, all of the pixels of each such tile are in the outputColorSpace and so need to be transformed into a displaying or printing color space. For example, if the original image at the imaging server is a color image in the color space RGB, the pixels obtained by the previous step of inverse subband transform are in the compression color space YIQ. For viewing they must be transformed back to RGB representation. If the ROI is at an exact dyadic resolution, then the tile of pixels in the rendering color space is written into the off-screen buffer. Else it is resized in a resizing step.

In case the resolution of the ROI is not an exact dyadic resolution, the image obtained by the previous step must be re-sized to this resolution. This is accomplished using operating system imaging functionality. In most cases the operating system's implementation is sub-sampling which produces in many cases an aliasing effect which is visually not pleasing. To provide higher visual quality, the imaging system uses a well-known method of linear interpolation. The output of the interpolation is written to the off-screen buffer. From there it is displayed on the screen using system device dependant methods.

Multi-Focal Fly-Through Review

Typically, the tissue on the glass slide has a thickness of several microns. When using an optical microscope, the pathologist is constantly using the continuous focus control each time he/she is panning or zooming on a different region of the slide, so as to increase the visual contrast of the cellular structure in that particular region. Normally, in whole slide imaging (WSI), slides are scanned into single 2D digital images and therefore local 'optimal' focal planes are computed and stitched together to generate a single 2D image with a visual appearance of a continuous tissue with zero thickness. The resulting clinical quality of the stitched single image is often found by pathologists to be unsatisfactory as they do not find it comparable to use of the optical microscope since the ability to continuously manipulate the focus and visually optimize each view has been eliminated.

Figure 15:
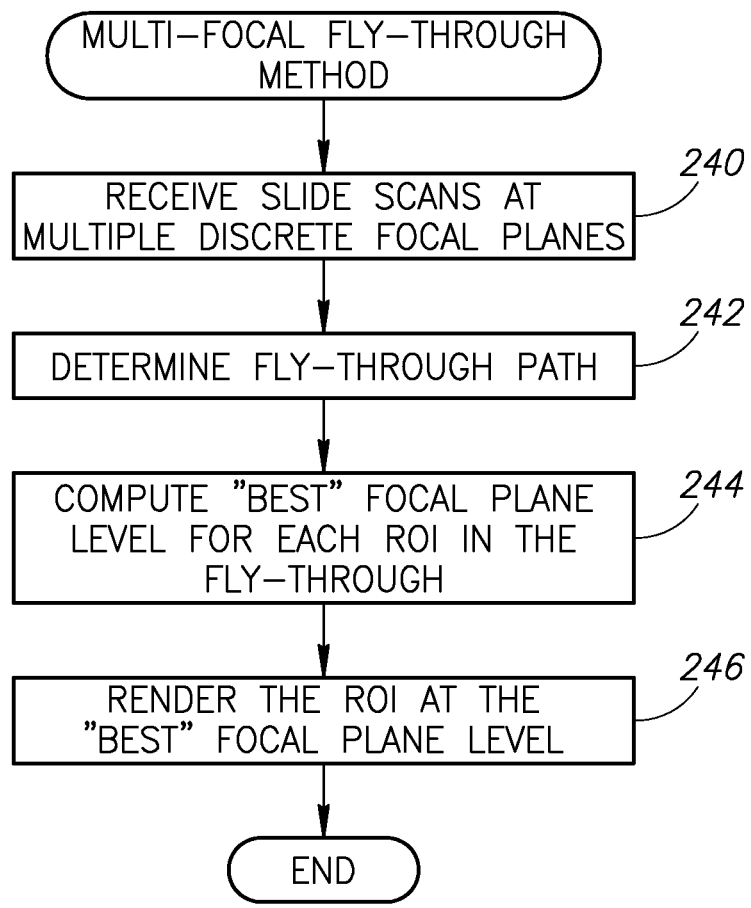
FIG. 15 is a flow diagram illustrating an example multi-focal fly-through method of the present invention.

A flow diagram illustrating an example multi-focal fly-through method of the present invention is shown in FIG. 15. In a multi-focal acquisition mode of the fly-through review process, slides are scanned at multiple discrete focal planes levels (step 240). Images of all these scans are stored. The fly-through review mechanism then determines the fly-through path using techniques described supra (step 242). Then, using continuous interpolation of these discrete focal planes, the fly-through mechanism provides the user with the desired experience of a continuous focus during the review of the slide.

In one embodiment, for multi-focal plane data, automatic focus is applied during the fly-through review. To achieve this, the viewer, for each ROI in the fly-through, determines and selects a 'best' (i.e. optimum) focal plane level from the set of discrete focal plane image scans (step 244) and renders the ROI at that selected 'best' focal plane (step 246). In one embodiment, the user has the ability to assume control over the focus function and set it manually as with other parameters.

Several well-known techniques may be used to compute a good focal plane. In one embodiment, for each ROI frame in the fly-through sequence, the focal plane having a maximal contrast is selected. This can be achieved in any of several ways.

In a first method, we assume that E(Y) is the average of intensity values over the given frame. For a color image, the intensity value of a single RGB pixel can be estimated by $$Y = 0.299R + 0.587G + 0.114B \tag{10}$$

The variance $\sigma^2$ of the intensity of N pixels is given as $$\sigma^2 = \frac{1}{N}\sum_{i=1}^{N}(Y_i - E(Y))^2 \tag{11}$$

This quantity is well-known to be a useful measure of the local image contrast over the given ROI frame.

In a second method to estimate local visual activity the Laplacian-Gaussian operator is used which is a well-known edge detection technique. The operator is a combination of a Gaussian smoothing filter followed by the Laplacian differentiation filter. High output values correspond to locations of strong edges. Assuming $GL(Y_i)$ is the result of a Laplacian-Gaussian filtering on the intensity value $Y_i$, then our measure of local image contrast over the given frame (of N pixels) can be expressed as $$\frac{1}{N}\sum_{i=1}^{N}|GL(Y_i)| \tag{12}$$

The above-description of the embodiments of the present invention has the technical effect of generating a fly-through review for digital images such as tissue sample scans based on the sample image from which one or more fly-through curves are generated and applying two-dimensional image manipulations to the sample image in accordance with the one or more fly-through curves and any user preferences to generate a sequence of frame images to be displayed.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of one or more embodiments of the invention. The embodiments were chosen and described in order to best explain the principles and the practical application, and to enable others of ordinary skill in the art to understand the one or more embodiments of the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A method to generate a fly-through review for a digitally imaged tissue sample, said method comprising:
    determining a fly-through path based on a user-selected fly-through starting point and a segmentation of a tissue boundary in said sample image to generate one or more fly-through curves;
    applying, using a processor, an image manipulation to said sample image in accordance with said one or more fly-through curves to generate a sequence of frame images to be displayed in an automatic fly-through review; and
    displaying the automatic fly-through review to the user.

2. The method of claim 1, wherein determining the fly-through path comprises applying tissue/glass boundary segmentation techniques to said sample image.

3. The method of claim 1, wherein determining the fly-through path comprises applying tissue/tissue boundary segmentation techniques to said sample image.

4. The method of claim 1, wherein the segment of the tissue boundary comprises a computed segmentation of the tissue boundary formed by applying a segmentation algorithm to said sample image.

5. The method of claim 1, wherein said method of generating a fly-through review is adapted to be performed on a client computer.

6. The method of claim 5, wherein sample image data is streamed from an imaging server to said client computer over a network using image streaming techniques.

7. The method of claim 1, wherein said method of generating a fly-through review is adapted to be performed on a server computer.

8. The method of claim 1, further comprising adapting the visualization of said fly-through path in accordance with user input.

9. The method of claim 1, further comprising rotating and aligning said display frame images during said fly-through review in accordance with user preferences.

10. A client computer to perform a fly-through review of a digitally imaged tissue sample, comprising:
    a communications interface to receive image data from an external image storage device adapted to store said sample image;
    a fly-through path generator operative to determine a fly-through path based on a user-selected fly-through starting point and a segmentation of a tissue boundary in said sample image data to generate one or more fly-through curves; and
    an image manipulation module operative to apply an image manipulation to said sample image in accordance with said one or more fly-through curves generated by said fly-through path generator to generate a sequence of frame images to be displayed in an automatic fly-through review and to display the automatic fly-through review to the user.

11. The client computer of claim 10, wherein the image manipulation module is operative to adapt the visualization of said fly-through path in accordance with user input.

12. The client computer of claim 10, further comprising a display operative to display said sequence of frame images to a user.

13. The client computer of claim 10, wherein sample image data stored of said external image storage device is streamed to said client computer over a network using image streaming techniques.

14. A computer readable storage device or storage disk storing a computer program product characterized by that upon loading it into computer memory a fly-through review process is executed, the computer program product including computer usable program code comprising:
    computer usable code configured to determine a fly-through path based on a user-selected fly-through starting point and a computed segmentation of a tissue boundary in said sample image to generate one or more fly-through curves;
    computer usable code configured to apply an image manipulation to said sample image in accordance with said one or more fly-through curves to generate a sequence of frame images to be displayed in an automatic fly-through review; and
    computer usable code configured to display the automatic fly-through review to the user.

15. A method to generate a fly-through review for a tissue sample digitally imaged at a plurality of focal plane levels, said method comprising:
    dividing each sample image into a plurality of regions of interest (ROIs);
    determining a fly-through path based on a user-selected fly-through starting point and a computed segmentation of a tissue boundary in said sample images to generate one or more fly-through curves;
    selecting an optimum focal plane level from said plurality of focal plane levels;
    rendering an ROI at the selected focal plane level;
    applying an image manipulation to said rendered ROI image data in accordance with said one or more fly-through curves to generate a sequence of frame images to be displayed in an automatic fly-through review; and
    displaying the automatic fly-through review to the user.

16. The method of claim 15, further comprising adapting the visualization of said fly-through path in accordance with user input.

17. A computer readable storage device or storage disk storing a computer program product characterized by that upon loading it into computer memory a fly-through review process for a tissue sample digitally imaged at a plurality of focal plane levels is executed, the computer program product including computer usable program code comprising:
    computer usable code configured to divide each sample image into a plurality of regions of interest (ROIs);
    computer usable code configured to determine a fly-through path based on a user-selected fly-through starting point and a computed segmentation of a tissue boundary in said sample images to generate one or more fly-through curves;
    computer usable code configured to select an optimum focal plane level from said plurality of focal plane levels;
    computer usable code configured to render an ROI at the selected focal plane level;
    computer usable code configured to apply an image manipulation to said rendered ROI image data in accordance with said one or more fly-through curves to generate a sequence of frame images to be displayed in an automatic fly-through review; and
    computer usable code to display the automatic fly-through review to the user.

* * * * *